March 11, 1947.  G. J. STAAB  2,417,273
SALT SHAKER
Filed Oct. 17, 1944
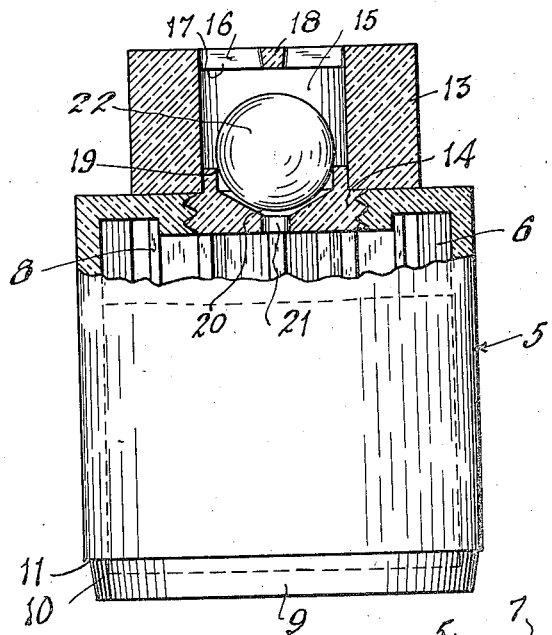
Fig. 1
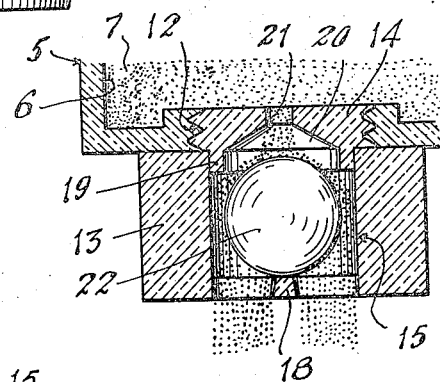
Fig. 2
Fig. 3
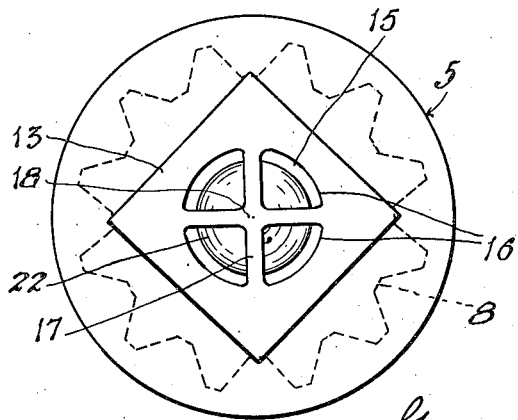
INVENTOR.
George J. Staab,
BY Harry B. Kook.
ATTORNEY.

Patented Mar. 11, 1947

2,417,273

UNITED STATES PATENT OFFICE 2,417,273

SALT SHAKER

George J. Staab, Springfield, N. J.

Application October 17, 1944, Serial No. 559,025

1 Claim. (Cl. 65—57)

This invention relates to condiment holders, particularly salt shakers, of the type which includes a ball valve for automatically maintaining the shaker sealed against entry of dust or moist air when the shaker is out of use.

A prime object of the invention is to provide such a device which shall embody novel and improved features of construction for insuring freedom of flow of the salt or other granules during use of the device.

Another object is to provide a salt shaker that is simple, inexpensive, durable and efficient in operation and attractive in appearance.

Still another object is to provide a shaker wherein the outlet member and the valve closure member are mounted on and removed from the shaker as a unit.

A further object is to provide a shaker in which all of the parts are formed of plastic material thereby eliminating the possibility of corrosion incident to galvanic action.

A still further object is to provide a shaker that will provide a spraying discharge of the contents.

Yet another object is to provide a shaker that will not become clogged up and can easily be cleaned if the contents become caked.

Other objects and advantages of the invention will be obvious from the description thereof to follow taken in connection with the accompanying drawing in which—

Figure 1 is a part elevational and part sectional view of a salt shaker embodying my invention shown in normal upright position.

Figure 2 is a sectional view of a part of the top of the shaker showing it inverted for discharging the contents.

Figure 3 is a top plan view.

The body 5 of the shaker or container is preferably cylindrical in shape and hollow forming a compartment 6 for salt 7 or other condiment. This body is formed of transparent thermoplastic material such as "Lucite" or the like. It may of course be any other suitable shape and formed of any other suitable transparent material. The inner surface of the body is corrugated or formed with elongated integral ribs 8 extending from the top to the bottom thereof. A base 9, of the same material, may be formed separate from the body and cemented or otherwise fastened thereto or it may, if desired, be integral therewith. The outer surface 10 of the base may be slanted downwardly and inwardly as shown leaving an overhanging shoulder 11 on the bottom of the body.

The top wall of the body has a central opening 12 formed with internal screw threads. An outlet member is removably mounted in this central opening and includes a cap member 13 and a nipple, neck or nut member 14 formed of the same material as the body 5.

The cap is shown square in shape in Figure 3 but it may be cylindrical or any other suitable shape. It is formed with a central chamber 15 and its top wall is provided with relatively large discharge orifices 16 separated by web-like portions 17 terminating at the center in a solid wall portion 18. The bottom of the cap is open.

The nipple is formed with a solid body having external screw threads for threaded engagement with the internal screw threads of the opening in the body and is provided with an upright annular flange 19. The lower open end of the cap 13 is cemented or otherwise suitably fastened to the outer surface of this flange and its lower edge rests on the upper surface of the top wall of the hollow body 5. The upper or outer surface of the body is inclined downwardly and inwardly from the annular flange 19, thus forming a funnel-like space 20 communicating with a passage 21 formed in the center of the body and leading to the interior of the body of the shaker below.

A ball or marble 22 formed of any suitable transparent material, such as glass or marble, and preferably polished, is loosely mounted in the chamber 15. The ball is of such a size that it neatly sits on the inner edge of the flange 19 but does not touch the inclined upper surface of the nipple, thus leaving a space between it and said inclined surface. A space is also provided between the ball and the top of the cap to permit movement of the ball toward the top. The cap, nipple and ball are attached and detached as a unit.

Ordinarily the ball rests on the flange of the nipple as shown in Figure 1 so as to prevent any dirt or moisture from getting into the body of the shaker and also to preserve any aroma which the condiment may have. When the shaker is used, of course, it will be inverted as shown in Figure 2 at which time the ball 22 will fall off its seat on the annular flange of the nipple and move to and rest on the solid wall portion 18 of the cap at which time the salt or other condiment will fall through the restricted passage 21 in the nipple and strike against and sift and spread out and around the ball and out through the discharge orifices 16 in the cap, in all directions.

The diameter of the passage 21 in the nut is so restricted or small relative to the diameter of the seat 19 that only a small discharge of the contents strikes against the ball so that no incrustation or packing of material on or around the surface of the ball is possible. I thus insure a tight, clean fitting joint between the ball and its seat on the edge of the annular flange of the nut.

The elongated ribs on the inner surface of the shaker body in addition to strengthening the same also serve to reflect the light rays passing through the body of the shaker thus making the shaker more attractive in appearance. The base portion of the body may also be colored in order to make the shaker appear more attractive.

It will be seen from the foregoing that I have designed a salt shaker that is simple and inexpensive to manufacture and attractive in appearance.

Changes in details might be resorted to without departing from the principle of the invention and I desire to be limited only by the state of the prior art and the appended claim.

I claim:

A salt shaker comprising a hollow container, a top wall having an internally screw threaded central opening, an externally screw threaded nut member fitted in said opening for detachably closing the same, said nut being formed with a solid body having a funnel-shaped outer surface and having a restricted central passage between said surface and the interior of the container, an annular upright flange integrally formed on the solid body and surrounding said funnel-shaped surface and having its inner edge of substantially greater diameter than said restricted passage, a hollow cap member secured to the outer surface of the flange and having a top wall formed with discharge orifices, and a ball valve in said cap member adapted to seat loosely on the edge of said flange for closing said passage, said ball valve and funnel-shaped outer surface being so disposed relatively that a space is provided therebetween when the ball valve is seated.

GEORGE J. STAAB.

REFERENCES CITED

The following references are of record in the file of this patent:

UNITED STATES PATENTS

| Number | Name | Date |
| --- | --- | --- |
| 1,229,680 | Vanderveer | June 12, 1917 |
| 417,981 | Boston | Dec. 24, 1889 |
| 968,890 | Sprinkle | Aug. 30, 1910 |
| 1,868,277 | Degner | July 19, 1932 |
| 1,861,980 | Rundell | June 7, 1932 |
| 903,548 | DeHayes | Nov. 10, 1908 |
| 1,005,705 | Hanke | Oct. 10, 1911 |
| 2,366,963 | Goldbert | Jan. 9, 1945 |

FOREIGN PATENTS

| Number | Country | Date |
| --- | --- | --- |
| 826,127 | France (Scotto) | Dec. 27, 1937 |
| 4,224 | England (Ellis) | Feb. 20, 1911 |